3,370,018
BICYCLIC FLUOROACETALS
Robert Arnold Braun, Newark, Del., assignor to E. I. du Pont de Nemours and Company, Wilmington, Del., a corporation of Delaware
No Drawing. Filed Oct. 26, 1964, Ser. No. 406,564
7 Claims. (Cl. 260—2)

ABSTRACT OF THE DISCLOSURE

Bicyclic fluoroacetals having the structure

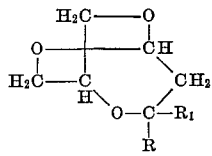

where R and $R_1$ are perfluoro- or perchloro-perfluoroalkyl radicals of 1 through 5 carbon atoms, and polymers made by exposing these fluoroacetals to Lewis acids.

---

This invention relates to novel bicyclic fluoroacetals and to novel polymers made from these bicyclic fluoroacetals. It is more particularly directed to bicyclic fluoroacetals having the structure (1)

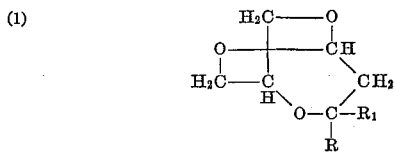

where each of R and $R_1$ can be perfluoro- or mixed perchloro-perfluoro alkyl radicals, all containing 1 through 5 carbon atoms, and to polymers made by exposing these fluoroacetals to Lewis acids.

Illustrative of the perfluoro- and mixed perchloroperfluoro radicals in the R and $R_1$ positions are $-CF_3$, $-CF_2Cl$, $-C_3F_7$, $-C_5F_{11}$, $-CCl_2F$, $-C_2F_5$, $-C_4F_9$, $-CF_2-CF_2Cl$, and $-CFCl_2$. R and $R_1$ need not be the same.

Preparation of the compounds

The fluoroacetal compounds of Formula 1 can be made by the stoichiometric reaction of glycidyl vinyl ether with a perfluoro- or perchloro-fluoroketone according to the equation (2)

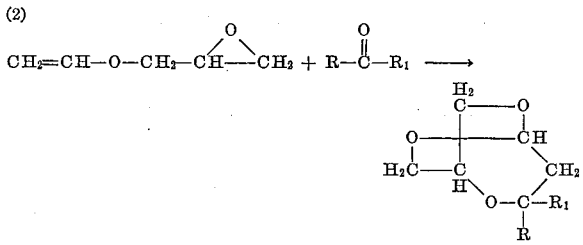

where R and $R_1$ have the same meaning as in Formula 1.

The reaction is run under anhydrous conditions, at atmospheric pressure or in a bomb. Reaction is brought about by bubbling the gaseous ketone reactant into the vinyl ether, or if the ketone reactant is liquid, by simply adding it to the vinyl ether. The product is sensitive to oxygen, so that reaction should be carried out in an inert atmosphere.

The reaction is exothermic and requires control to keep the temperature within $-20$ to $+100°$ C. In this temperature range, the reaction proceeds quickly and should, in most cases, be substantially finished in about 2 hours.

The reaction mass announces completion by no longer evolving heat.

The bicyclic fluoroacetal products are isolated from the reaction mass by fractional distillation under reduced pressure. The products are colorless liquids.

The temperature of the reaction can be more carefully controlled if it is run in a solvent such as an ether having a boiling point below 50° C., or in a liquid hydrocarbon such as benzene, pentane or hexane. Equal volumes of reactant and solvent should be used.

Polymerization

The novel compounds of Formula 1 can be polymerized in methylene chloride or in ethers having boiling points below about 50° C. The monomer should be present at a concentration of about 20% by weight of the reaction mass. The reaction is catalyzed by Lewis acids such as $BF_3$, $BF_3$-etherate, antimony trifluoride or phosphorous pentafluoride, at concentrations of about 0.001% to 0.1% by weight of the reaction mass.

The polymerization is highly exothermic and requires control to keep the temperature of the reaction mass to within the range $-40$ to $0°$ C. The monomer reactant is sensitive to oxygen and it is therefore preferred to carry on the polymerization in an inert atmosphere.

The reaction proceeds rather quickly, and in most cases is substantially complete in about 2 hours. As in the preparation of the monomer, completion is announced by the cessation of heat evolution.

The polymer is then precipitated from the polymerization medium with methyl alcohol or ethyl alcohol, while blending the medium in a blendor to prevent lumps.

The resulting precipitate is filtered from the reaction mass and dried under low heat to give a solid free-flowing powder.

The polymers of the invention have softening points within the range of about 150° C. to 250° C. All are soluble in ethers and alcohols and most are soluble in dimethylformamide, dimethylacetamide and butyrolactone.

In addition to this homopolymerization, the bicyclic fluoroacetals of Formula 1 copolymerize with other cyclic monomers which undergo acid-catalyzed ring opening polymerization. Illustrative of such monomers are trioxane; 1,3-dioxolane; 1,4-epoxycyclohexane and tetrahydrofuran. Such a copolymerization presents a novel and unique method for introducing fluorine atoms into the copolymer molecules.

Utility

The bicyclic fluoroacetals of Formula 1 are, as already discussed, useful as monomers in the preparation of homopolymers and copolymers.

The polymers in turn find their greatest usefulness as adhesives. A 5–10% solution of one of the polymers, when spread between the surfaces of two pieces of wood or metal which are then clamped and heated to 100–150° C. for about 30 minutes, provides an excellent bond between the pieces.

The polymers can also be used as film-forming components in coating compositions. A 5–10% solution of a polymer in a solvent such as dimethylformamide, when spread on a suitable surface and baked at 100–150° C. for from 30 minutes to 2 hours, gives a tack-free film which is highly resistant to water, alcohols and ketones.

Examples

The invention will be more easily understood and readily practiced by referreing to the following examples. These examples are intended to be illustrative and exemplify only the preferred embodiments of the invention. Those skilled in the art will no doubt compose variations on the central theme, the foremost among these probably being the addition of innocuous substituents to the bicyclic fluoroacetal molecule. Whatever these variations, they are naturally considered to be within the framework of the basic inventive concept.

EXAMPLE 1

A flask fitted with a magnetic stirrer, two gas inlet tubes, a thermometer, and a Dry Ice condenser is flamed out under nitrogen and cooled. Hexafluoroacetone (48 grams, 0.289 mole) is then condensed into the flask. When the temperature is −20° C., glycidyl vinyl ether (28.9 grams, 0.289 mole) is slowly added.

The reaction mixture is stirred for 2 hours at −20° C. under a nitrogen blanket. The cooling bath is then removed. The mixture is warmed to +20° C.

After stripping the mixture at 0.2 mm. of pressure, the residue (71 grams) is fractionated using a spinning band column. The main fraction, a colorless liquid, has a boiling point of 43° C. at 0.3 mm. of pressure, a refractive index of $n_D^{25}$ 1.3630, and weighs 47.3 grams.

*Analysis.*—Calculated for $C_8H_8F_6O_3$: C, 35.97; H, 3.02; F, 42.67; MW. 267. Found: C, 35.35; H, 2.87; F, 42.85; MW. (f. pt. benzene) 259.

This product is 3,3-bis-(trifluoromethyl)-2,6,9-trioxabicyclo[3.3.2]nonane.

EXAMPLE 2

The equipment and its preparation are the same as in Example 1. Glycidyl vinyl ether (20 grams, 0.2 mole) is added to a solution of dichlorotetrafluoroacetone (40.0 grams, 0.2 mole) in 100 ml. of anhydrous ether at 25–30° C. The solution is heated to 35° C. and kept at that temperature for 3 hours.

The solvent is then removed under reduced pressure. Fractional distillation of the residue gives 17.3 grams of 3,3 - bis - (monochlorodifluoromethyl)-2,6,9-trioxabicyclo [3.2.2]nonane.

*Analysis.*—Calculated for $C_8H_8Cl_2F_4O_4$: C, 32.13; H, 2.70; F, 25.41. Found: C, 32.05; H, 2,89; F, 24.92.

EXAMPLE 3

A flask fitted with a thermometer, a dropping funnel, a stirrer and an inlet for nitrogen is dried in an oven at 150° C. and then cooled under nitrogen.

One ml. of freshly distilled $BF_3$ etherate at −20° C. is added to a solution of 10.8 parts of the 3,3-bis(trifluoromethyl)-2,6,9-trioxabicyclo[3.3.2]nonane prepared in Example 1 in 75 parts of methylene chloride (which has previously been dried over molecular sieves), under nitrogen.

Polymerization proceeds at a rapid pace, raising the temperature to about +10° C. The temperature of the reaction mass is kept at −20 to −40° C. for about 3½ hours, after which a white solid is collected, washed with 100 parts of ethanol in a Waring Blendor and then dried in a vacuum oven.

The polymer thus prepared is a free-flowing white powder having a softening point between 210 and 220° C. It is insoluble in hot and cold ether, in methanol, in chlorobenzene and hexamethylphosphoramide. It is partly soluble in dimethylformamide, dimethylacetamide and butyrolactone.

A 10% solution of this polymer is prepared in butyrolactone. This solution is then brushed on the upper surfaces of two steel panels. The coated surfaces are placed together, and the panels are then clamped and heated at 100–150° C. for 1 hour. The bond formed between the panels is exceptionally strong.

EXAMPLE 4

The procedures in Example 3 are repeated, using 15 parts of the compound prepared in Example 2 as a monomer in 75 parts of dimethyl ether. 0.02 part of $BF_3$ gas is bubbled into the monomer solution as a catalyst.

The resulting polymer is a free-flowing solid having a softening point between 210 and 220° C. It is insoluble in hot and cold ether, methanol, chlorobenzene and hexamethylphosphoramide. It is partly soluble in dimethyl formamide, dimethyl acetamide and butyrolactone.

I claim:

1. A bicyclic fluoroacetal having the structure

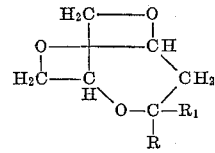

where R and $R_1$ are selected from the group consisting of perfluoro- and mixed percholoro-perfluoroalkyl radicals, all containing 1 through 5 carbon atoms.

2. A compound according to claim 1 wherein R and $R_1$ are perfluoroalkyl radicals of 1 through 5 carbon atoms.

3. A compound according to claim 1 wherein R and $R_1$ are —$CF_3$ radicals.

4. A polymer prepared by contacting a compound of claim 1 with a Lewis acid at a temperature of −40° C. to 0° C.

5. A polymer prepared by contacting a compound of claim 2 with a Lewis acid at a temperature of −40° C. to 0° C.

6. A polymer prepared by contacting a compound of claim 3 with a Lewis acid at a temperature of −40° C. to 0° C.

7. A method for the preparation of a bicyclic fluoroacetal, said method comprising reacting glycidyl vinyl ether with a ketone of the formula

where R and $R_1$ are selected from the group consisting of perfluoro- and mixed perchloro-perfluoro-alkyl radicals, all containing 1 through 5 carbon atoms, in the absence of oxygen, under substantially anhydrous conditions, at a temperature of between −20 and +100° C.

No references cited.

SAMUEL H. BLECH, *Primary Examiner.*